United States Patent Office 2,916,370
Patented Dec. 8, 1959

2,916,370

CHLORINATED THIOLCARBAMATES AND THEIR USE AS HERBICIDES

Harry Tilles, El Cerrito, and Joe Antognini, Mountain View, Calif., assignors to Stauffer Chemical Company, a corporation of Delaware No Drawing. Application April 2, 1957
Serial No. 650,095

12 Claims. (Cl. 71—2.7)

This invention relates to certain novel compositions of matter and the use of such compositions as herbicides. More particularly, it has been found that certain alkyl thiolcarbamates having a chloroalkyl or chloroalkenyl substituent on the nitrogen atom and wherein the other substituent on the nitrogen atom is an alkyl radical or alkenyl radical, a chloroalkyl radical or hydrogen have valuable herbicidal properies and are particularly useful as pre-emergence herbicides.

Thus the compounds of the present invention may be represented by the following structural formula:

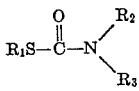

wherein $R_1$ is a lower alkyl radical either straight or branched chain, $R_2$ is a chloroalkyl radical or chloroalkenyl radical, and $R_3$ is a chloroalkyl radical, an alkyl radical, an alkenyl radical or hydrogen.

As non-limiting examples, $R_1$, $R_2$ and $R_3$ can be as follows:

| $R_1$ | $R_2$ | $R_3$ |
|---|---|---|
| $C_2H_5-$ | $CH_3CHClCH_2-$ | $CH_3CHClCH_2-$ |
| $n-C_3H_7-$ | $CH_3CHClCH_2-$ | $CH_3CHClCH_2-$ |
| $n-C_4H_9-$ | $CH_3CHClCH_2-$ | $CH_3CHClCH_2-$ |
| $C_2H_5-$ | $ClCH_2CH_2-$ | $ClCH_2CH_2-$ |
| $n-C_3H_7-$ | $ClCH_2CH_2-$ | $ClCH_2CH_2-$ |
| $n-C_4H_9-$ | $ClCH_2CH_2-$ | $ClCH_2CH_2-$ |
| $i-C_4H_9-$ | $ClCH_2CH_2-$ | $ClCH_2CH_2-$ |
| $C_2H_5-$ | $ClCH_2CH_2-$ | $CH_3-$ |
| $n-C_3H_7-$ | $ClCH_2CH_2-$ | $CH_3-$ |
| $n-C_4H_9-$ | $ClCH_2CH_2-$ | $CH_3CH_2-$ |
| $C_2H_5-$ | $ClCH_2CH_2CH_2-$ | H |
| $n-C_3H_7-$ | $ClCH_2CH_2CH_2-$ | H |
| $n-C_4H_9-$ | $ClCH_2CH_2CH_2-$ | H |
| $C_2H_5-$ | $ClCH=CHCH_2-$ | $CH_3CH_2CH_2-$ |
| $CH_3CH_2CH_2-$ | $ClCH=CHCH_2-$ | $CH_3CH_2CH_2-$ |
| $CH_3CH_2CH_2CH_2-$ | $ClCH=CHCH_2-$ | $CH_3CH_2CH_2-$ |
| $C_2H_5-$ | $ClCH=CHCH_2-$ | $CH_3-$ |
| $CH_3CH_2CH_2-$ | $ClCH=CHCH_2-$ | $CH_3-$ |
| $CH_3CH_2CH_2CH_2-$ | $ClCH=CHCH_2-$ | $CH_3-$ |
| $C_2H_5-$ | $ClCH=CHCH_2-$ | $CH_2=CHCH_2-$ |
| $CH_3CH_2CH_2-$ | $ClCH=CHCH_2-$ | $CH_2=CHCH_2-$ |
| $CH_3CH_2CH_2CH_2-$ | $ClCH=CHCH_2-$ | $CH_2=CHCH_2-$ |

The following non-limiting examples illustrate methods by which the compounds can be made. (Code numbers have been assigned to the compounds and are used hereinafter.)

*Example I—(R-2066).*—About 17.1 g. (0.083 mole) of di-2-chloropropylamine hydrochloride was dissolved in 50 cc. of water and 6.5 g. (0.163 mole) of sodium hydroxide was added, keeping the temperature of the solution below 10° C. by cooling in an ice bath. 50 cc. of petroleum ether, B.P. 30–60° C. was added to this mixture and then 10 g. (0.080 mole) of ethyl chlorothiolformate was slowly added at a temperature range of 5–10° C. After completion of the addition, the reaction mixture was stirred for 10 minutes and then the petroleum ether solution containing the product was decanted from the aqueous solution. The organic phase was then successively washed with 1–50 cc. portion of water, 1–50 cc. portion of dilute hydrochloric acid and 1–50 cc. portion of water. It was then dried over anhydrous magnesium sulfate, filtered and solvent was evaporated on the steam bath with the aid of a current of air. There remained behind 19 g. (91.3% yield) of ethyl N,N-di-2-chloropropylthiolcarbamate, $n_D^{25}$ 1.5043.

*Analysis.*—Calculated for chlorine, 27.5%. Found: 27.3%.

*Example II—(R-2067).*—When the general procedure of Example I was repeated except 20.2 g. (0.097 mole) of di-2-chloropropylamine hydrochloride, 13.1 g. (0.095 mole) of n-propylchlorothiolformate, and 7.7 g. (0.192 mole) of sodium hydroxide were employed, there was obtained 21.7 g. (84.5% yield) of n-propyl N,N-di-2-chloropropylthiolcarbamate $n_D^{27}$ 1.4989.

*Example III—(R-2069).*—When the general procedure of Example I was repeated except 14 g. (0.68 mole) of di-2-chloropropylamine hydrochloride, 10 g. (0.066 mole) of n-butylchlorothiolformate, and 5.3 g. (0.133 mole) of sodium hydroxide were employed, there was obtained 15.2 g. (80.8% yield) of n-butyl N,N-di-2-chloropropylthiolcarbamate, $n_D^{25}$ 1.4995.

*Example IV—(R-2070).*—When the general procedure of Example I was repeated except 14.8 g. (0.083 mole) of di-2-chloroethylamine hydrochloride, 10 g. (0.080 mole) of ethyl chlorothiolformate and 6.5 g. (0.163 mole) of sodium hydroxide were employed, there was obtained 16.0 g. (86.5% yield) of ethyl N,N-di-2-chloroethylthiolcarbamate, $n_D^{25.5}$ 1.5186.

*Example V—(R-2071).*—When the general procedure of Example I was repeated except 12.1 g. (0.068 mole) of di-2-chloroethylamine hydrochloride, 10 g. (0.066 mole) of n-butylchlorothiolformate and 5.3 g. (0.133 mole) of sodium hydroxide were employed, there was obtained 14.8 g. (87.5% yield) of n-butyl N,N-di-2-chloroethylthiolcarbamate, $n_D^{27.5}=1.510$.

*Example VI—(R-2072).*—When the general procedure of Example I was repeated except 13.3 g. (0.074 mole) of di-2-chloroethylamine hydrochloride, 10 g. (0.072 mole) of n-propyl chlorothiolformate and 5.9 g. (0.47 mole) of sodium hydroxide were employed, there was obtained 15.0 g. (85.2% yield) of n-propyl N,N-di-2-chloroethylthiolcarbamate, $n_D^{27}=1.5159$.

*Example VII—(R-2073).*—When the general procedure of Example I was repeated except 12.1 g. (0.068 mole) of di-2-chloroethylamine hydrochloride, 10 g. (0.066 mole) of isobutyl chlorothiolformate and 5.3 g. (0.133 mole of sodium hydroxide were employed, there was obtained 14.8 g. (87.5% yield) of isobutyl N,N-di-2-chloroethylthiolcarbamate, $n_D^{27.5}$ 1.5102.

*Example VIII—(R-2134).*—When the general procedure of Example I was repeated except 8 g. (0.056 mole) of 2-chlorodiethylamine hydrochloride, 6.7 g. (0.054 mole) of ethyl chlorothiolformate and 4.4 g. (0.110 mole) of sodium hydroxide were employed, there was obtained 8.3 g. (78.3% yield) of ethyl N-2-chloroethyl-N-ethylthiolcarbamate, $n_D^{25}$ 1.5027

*Example IX—(R-2135).*—When the general procedure of Example I was repeated except 8 g. (0.056 mole) of 2-chlorodiethylamine hydrochloride, 7.5 g. (0.054 mole) of n-propyl chlorothiolformate and 4.4 g. (0.110 mole) of sodium hydroxide were employed, there was obtained 10.7 g. (94.7% yield) of n-propyl N-2-chloroethyl-N-ethylthiolcarbamate, $n_D^{25}$ 1.4970.

Example X—(R-2136).—When the general procedure of Example I was repeated except 8 g. (0.056 mole) of 2-chlorodiethylamine hydrochloride, 8.3 g. (0.054 mole) of n-butyl chlorothiolformate and 4.4 g. (0.110 mole) of sodium hydroxide were employed, there was obtained 10.8 g. (85.7% yield) of n-butyl N-2-chloroethyl-N-ethylthiolcarbamate, $n_D^{25}$ 1.4954.

Example XI—(R-2137).—When the general procedure of Example I was repeated except 10.8 g (0.083 mole) of 3-chloropropylamine hydrochloride, 10 g. (0.080 mole) of ethyl chlorothiolformate and 6.5 g. (0.163 mole) of sodium hydroxide were employed, there was obtained 13.9 g. (95.3% yield) of ethyl N-3-chloropropylthiolcarbamate, $n_D^{25}$ 1.5090.

Example XII—(R-2138).—When the general procedure of Example I was repeated except 9.7 g. (0.074 mole) of 3-chloropropylamine hydrochloride, 10 g. (0.072 mole) of n-propyl chlorothiolformate and 5.9 g. (0.147 mole) of sodium hydroxide were employed, there was obtained 12.2 g. (86.5% yield) of n-propyl N-3-chloropropylthiolcarbamate, $n_D^{26.5}$ 1.5085.

Example XIII—(R-2139).—When the general procedure of Example I was repeated except 8.8 g. (0.068 mole) of 3-chloropropylamine hydrochloride, 10 g. (0.066 mole) of n-butyl chlorothiolformate and 5.3 g. (0.133 mole) of sodium hydroxide were employed, there was obtained 12.2 g. (89.0% yield) of n-butyl N-3-chloropropylthiolcarbamate, $n_D^{28}$ 1.5043.

Example XIV—(R-2191).—About 4.0 g. (0.10 mole) of sodium hydroxide was dissolved in 50 cc. of water and to this solution was added 13.8 g. (0.103 mole) of N-3-chloroallyl-n-propylamine and 50 cc. of ethyl ether. The mixture was cooled in an ice bath to 5° C. and then 12.5 g. (0.10 mole) of ethyl chlorothiolformate was added slowly, keeping the temperature of the reaction mixture at 5°–10° C. After completion of the addition, the ether solution was separated from the water phase and was washed with 1–50 cc. portion of dilute hydrochloric acid (3 cc. of concentrated hydrochloric acid diluted to 50 cc. with water) and 1–25 cc. portion of water. It was then dried over anhydrous magnesium sulfate, filtered, and the filtrate was concentrated on the steam bath with the aid of a current of air. There was obtained as a residue, 19.5 g. (88.2% yield) of ethyl N-3-chloroallyl N-n-propylthiolcarbamate, $n_D^{30}$ 1.5061.

Example XV—(R-2192).—When the general procedure of Example XIV was repeated except that 13.8 g. (0.103 mole) of N-3-chloroallyl-n-propylamine, 13.9 g. (0.100 mole) of n-propyl chlorothiolformate and 4.0 g. (0.100 mole) of sodium hydroxide were employed, there was obtained 22.0 g. (93.2% yield) of n-propyl N-3-chloroallyl-N-n-propylthiolcarbamate, $n_D^{30}$ 1.5028.

Example XVI—(R-2193).—When the general procedure of Example XIV was repeated except that 13.8 g. (0.103 mole) of N-3-chloroallyl-n-propylamine, 15.3 g. (0.100 mole) of n-butyl chlorothiolformate and 4.0 g. (0.100 mole) of sodium hydroxide were employed, there was obtained 22.4 g. (89.6% yield) of n-butyl N-3-chloroallyl-N-n-propylthiolcarbamate, $n_D^{30}$ 1.5004.

Example XVII—(R-2204).—When the general procedure of Example XIV was repeated except that 5.5 g. (0.052 mole) of N-3-chloroallyl methylamine, 6.3 g. (0.050 mole) of ethyl chlorothiolformate and 2.0 g. (0.050 mole) of sodium hydroxide were employed, there was obtained 8.2 g. (84.5% yield) of ethyl N-3-chloroallyl-N-methylthiolcarbamate, $n_D^{30}$ 1.5172.

Example XVIII—(R-2205).—When the general procedure of Example XIV was repeated except that 5.5 g. (0.052 mole) of N-3-chloroallyl methylamine, 6.9 g. (0.050 mole) of n-propyl chlorothiolformate and 2.0 g. (0.050 mole) of sodium hydroxide were employed, there was obtained 9.5 g. (88.0% yield) of n-propyl N-3-chloroallyl-N-methylthiolcarbamate, $n_D^{30}$ 1.5116.

Example XIX—(R-2206).—When the general procedure of Example XIV was repeated except that 5.5 g. (0.052 mole) of N-3-chloroallyl methylamine, 7.7 g. (0.050 mole) of n-butyl chlorothiolformate and 2.0 g. (0.050 mole) of sodium hydroxide were employed, there was obtained 10.4 g. (93.6% yield) of n-butyl N-3-chloroallyl-N-methylthiolcarbamate, $n_D^{30}$ 1.5070.

Example XX—(R-2207).—When the general procedure of Example XIV was repeated except that 13.6 g. (0.103 mole) of N-3-chloroallyl allylamine, 12.5 g. (0.100 mole) of ethyl chlorothiolformate and 4.0 g. (0.100 mole) of sodium hydroxide were employed, there was obtained 16.0 g. (72.7% yield) of ethyl N-3-chloroallyl-N-allylthiolcarbamate, $n_D^{30}$ 1.5182.

Example XXI—(R-2208).—When the general procedure of Example XIV was repeated except that 13.6 g (0.103 mole) of N-3-chloroallyl allylamine, 13.9 g. (0.100 mole) of n-propyl chlorothiolformate and 4.0 g. (0.100 mole) of sodium hydroxide were employed, there was obtained 21.7 g. (92.7% yield) of n-propyl N-3-chloroallyl-N-allylthiolcarbamate, $n_D^{30}$ 1.5137.

Example XXII—(R-2209).—When the general procedure of Example XIV was repeated except that 13.6 g. (0.103 mole) of N-3-chloroallyl allylamine, 15.3 g. (0.100 mole) of n-butyl chlorothiolformate and 4.0 g. (0.100 mole) of sodium hydroxide were employed, there was obtained 23.1 g. (93.1% yield) of n-butyl N-3-chloroallyl-N-allylthiolcarbamate, $n_D^{30}$ 1.5102.

The compounds of the present invention have been extensively tested as herbicides and have been particularly evaluated as pre-emergence herbicides. Pre-emergence herbicides are ordinarily used by placing a narrow band of the herbicide over the center of a seeded crop row at time of planting or before crop emerges. If the herbicide is harmless to the desired crop, seeds or seedlings, but phytotoxic to the weed seeds or seedlings most frequently encountered, the crop grows in an almost weed-free environment. Of course, the pre-emergence herbicide may be used over the entire field, but it is normally used in a narrow band which straddles the crop row and the balance of the weeds are controlled by various cultivation methods. Generally speaking, the herbicides of the present invention are selective toward grasses and broad-leafed plants, and so are effective against the most common weeds but have little effect on such valuable row crops as corn, peas and beans, although various specific compounds are selective in different ways as the following data show. The phytocidal composition may be applied to the soil in any convenient form. For instance, it can be dissolved in a solvent, such as acetone, or emulsified and sprayed onto the soil, or it can be combined with a dry inert carrier and applied as a dust or as granules; although the composition may be applied to an entire crop plot, it is generally preferred to apply it in a narrow band, say 6", over the seeded row of a newly planted crop. Generally, rates of application of from one-half to 500 pounds per acre of actual area treated will be found suitable.

The compounds of the present invention have been investigated for phytocidal effect. In one series of tests the seeds of various plants were planted in 3" diameter paper cans in Santa Cruz loam. The cans were watered and an amount of each compound was applied as an acetone solution to each can which would correspond to a rate of application of 365 pounds per acre of the actual compound under test. Similar controls were planted and all of the cans were maintained in a greenhouse, watered as needed, and the germination and growth of the treated cans were compared with the controls. Germination was reported on a scale of 0–100 and growth on a scale of 0–10; 100 and 10 represent, respectively, no deviation from the control.

The following data were obtained.

| Compound | Oats | | Cucumbers | | Radish | |
|---|---|---|---|---|---|---|
| | Percent Ge. | Gr. | Percent Ge. | Gr. | Percent Ge. | Gr. |
| R-2066 | 0 | ------ | 50 | 3 | 75 | 6 |
| R-2067 | 0 | ------ | 100 | 10 | 100 | 10 |
| R-2069 | 25 | 0+ | 100 | 10 | 100 | 10 |
| R-2070 | 5 | 0+ | 5 | 0+ | 50 | 0+ |
| R-2071 | 5 | 0+ | 50 | 2 | 100 | 10 |
| R-2072 | 0 | ------ | 5 | 4 | 50 | 6 |
| R-2073 | 5 | 0+ | 100 | 8 | 100 | 9 |
| R-2134 | 0 | ------ | 0 | ------ | 75 | 8 |
| R-2135 | 0 | ------ | 0 | ------ | 100 | 10 |
| R-2136 | 0 | ------ | 10 | 5 | 75 | 8 |
| R-2137 | 0 | ------ | 0 | ------ | 0 | ------ |
| R-2138 | 0 | ------ | 0 | ------ | 0 | ------ |
| R-2139 | 0 | ------ | 0 | ------ | 10 | 0+ |
| R-2191 | 0 | ------ | 0 | ------ | 75 | 7 |
| R-2192 | 0 | ------ | 0 | ------ | 75 | 7 |
| R-2193 | 0 | ------ | 0 | ------ | 100 | 10 |
| R-2204 | 0 | ------ | 0 | ------ | 25 | 0+ |
| R-2205 | 0 | ------ | 0 | ------ | 25 | 3 |
| R-2206 | 0 | ------ | 0 | ------ | 75 | 8 |
| R-2207 | 0 | ------ | 0 | ------ | 0 | ------ |
| R-2208 | 0 | ------ | 0 | ------ | 25 | 1 |
| R-2209 | 0 | ------ | 0 | ------ | 50 | 6 |

Ge.=germination. Gr.=growth.

Similar tests were made on other types of seeds in the same manner as is reported, except that the rates of application were 40 and 10 pounds per acre. The following data were obtained:

| Compound | Rate/Acre, lb. | Pea | | Corn | | Radish | | Rye | | Squash or Cucumber | |
|---|---|---|---|---|---|---|---|---|---|---|---|
| | | Ge.[1] | Gr.[2] | Ge. | Gr. | Ge. | Gr. | Ge. | Gr. | Ge. | Gr. |
| R-2066 | 40 | 100 | 10 | 100 | 9 | 100 | 10 | 25 | 0+ | 75 | 8 |
| | 10 | 100 | 10 | 100 | 10 | 100 | 10 | 75 | 1 | 100 | 10 |
| R-2067 | 40 | 100 | 10 | 100 | 8 | 100 | 10 | 50 | 0+ | 100 | 10 |
| | 10 | 100 | 10 | 100 | 10 | 100 | 10 | 100 | 1 | 100 | 10 |
| R-2069 | 40 | 100 | 10 | 100 | 8 | 100 | 10 | 50 | 1 | 100 | 10 |
| | 10 | 100 | 10 | 100 | 10 | 100 | 10 | 100 | 7 | 100 | 10 |
| R-2070 | 40 | 100 | 10 | 100 | 10 | 100 | 10 | 100 | 8+ | 100 | 10 |
| | 10 | 100 | 10 | 100 | 10 | 100 | 10 | 100 | 0+ | 100 | 10 |
| R-2071 | 40 | 100 | 10 | 100 | 10 | 100 | 10 | 0 | ------ | 100 | 10 |
| | 10 | 100 | 10 | 100 | 10 | 100 | 10 | 75 | 0+ | 100 | 10 |
| R-2072 | 40 | 100 | 10 | 100 | 7 | 100 | 10 | 0 | ------ | 100 | 10 |
| | 10 | 100 | 10 | 100 | 10 | 100 | 10 | 75 | 0+ | 100 | 10 |
| R-2073 | 40 | 100 | 10 | 100 | 10 | 100 | 10 | 0 | ------ | 100 | 10 |
| | 10 | 100 | 10 | 100 | 10 | 100 | 10 | 75 | 0+ | 100 | 10 |
| R-2134 | 40 | 100 | 10 | 100 | 10 | 100 | 10 | 25 | 0+ | 100 | 10 |
| | 10 | 100 | 10 | 100 | 10 | 100 | 10 | 25 | 0+ | 100 | 10 |
| R-2135 | 40 | 100 | 6 | 100 | 10 | 100 | 10 | 0 | ------ | 100 | 10 |
| | 10 | 100 | 9 | 100 | 10 | 100 | 10 | 0 | ------ | 75 | 9 |
| R-2136 | 40 | 100 | 5 | 100 | 10 | 100 | 10 | 0 | ------ | 100 | 10 |
| | 10 | 100 | 8 | 100 | 10 | 100 | 10 | 0 | ------ | 0 | ------ |
| R-2137 | 40 | 50 | 0+ | 100 | 10 | 100 | 10 | 100 | 8 | 75 | 6 |
| | 10 | 25 | 1 | 100 | 10 | 100 | 10 | 0 | ------ | 10 | 3 |
| R-2138 | 40 | 10 | 0+ | 100 | 6 | 100 | 10 | 0 | ------ | 75 | 6 |
| | 10 | 10 | 0+ | 100 | 10 | 100 | 10 | 75 | 7 | 50 | 8 |
| R-2139 | 40 | 0 | ------ | 100 | 4 | 100 | 10 | 0 | ------ | 50 | 8 |
| | 10 | 100 | 6 | 100 | 10 | 100 | 10 | 50 | 3 | 100 | 10 |
| R-2191 | 40 | 100 | 5 | 100 | 7 | 0 | ------ | 0 | ------ | 100 | 10 |
| | 10 | 100 | 6 | 100 | 10 | 100 | 8 | 0 | ------ | 100 | 10 |
| R-2192 | 40 | 100 | 3 | 100 | 6 | 0 | ------ | 0 | ------ | 100 | 10 |
| | 10 | 100 | 7 | 100 | 9 | 75 | 7 | 0 | ------ | 100 | 10 |
| R-2193 | 40 | 100 | 7 | 100 | 8 | 25 | 3 | 0 | ------ | 100 | 10 |
| | 10 | 100 | 9 | 100 | 10 | 75 | 8 | 0 | ------ | 100 | 10 |
| R-2204 | 40 | 100 | 6 | 100 | 8 | 0 | ------ | 25 | 1 | 100 | 10 |
| | 10 | 100 | 6 | 100 | 9 | 0 | ------ | 75 | 7 | 100 | 10 |
| R-2205 | 40 | 50 | 2 | 100 | 7 | 0 | ------ | 0 | ------ | 100 | 10 |
| | 10 | 100 | 6 | 100 | 9 | 25 | 2 | 75 | 1 | 100 | 10 |
| R-2206 | 40 | 100 | 5 | 100 | 7 | 0 | ------ | 0 | ------ | 100 | 10 |
| | 10 | 100 | 8 | 100 | 9 | 25 | 4 | 50 | 0+ | 100 | 10 |
| R-2207 | 40 | 100 | 5 | 100 | 8 | 0 | ------ | 0 | ------ | 100 | 10 |
| | 10 | 100 | 6 | 100 | 10 | 0 | ------ | 50 | 0+ | 100 | 10 |
| R-2208 | 40 | 50 | 2 | 100 | 8 | 25 | 3 | 0 | ------ | 100 | 10 |
| | 10 | 100 | 6 | 100 | 10 | 50 | 3 | 0 | ------ | 100 | 10 |
| R-2209 | 40 | 50 | 6 | 100 | 10 | 75 | 8 | 0 | ------ | 100 | 10 |
| | 10 | 100 | 10 | 100 | 10 | 75 | 8 | 25 | 0+ | 100 | 10 |

[1] Ge.=germination.
[2] Gr.=growth.
R-2066 through R-2139=cucumber.
R-2191 through R-2209=squash.

This application is a continuation in part of our application, Serial Number 633,530, filed January 11, 1957, and now abandoned.

We claim:
1. A new compound of the formula

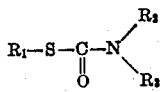

wherein $R_1$ is a lower alkyl radical, $R_2$ is selected from the group consisting of chloroalkyl radicals and chloroallyl radicals and $R_3$ is selected from the group consisting of chloroalkyl radicals, alkyl radicals, allyl radicals and hydrogen.

2. As a new compound: ethyl N,N-di-2-chloropropylthiolcarbamate.

3. As a new compound: ethyl N-3-chloroallyl-N-n-propylthiolcarbamate.

4. As a new compound: n-propyl N-3-chloroallyl-N-n-propylthiolcarbamate.

5. As a new compound: n-propyl N-3-chloroallyl-N-allylthiolcarbamate.

6. As a new compound: n-butyl N-3-chloroallyl-N-allylthiolcarbamate.

7. The method of combatting weeds comprising applying to the soil a phytotoxic amount of compound having the formula.

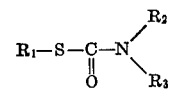

wherein $R_1$ is a lower alkyl radical, $R_2$ is selected from the group consisting of chloroalkyl radicals and chloroallyl radicals and $R_3$ is selected from the group consisting of chloroalkyl radicals, alkyl radicals, allyl radicals and hydrogen.

8. The method of combatting weeds comprising applying to the soil a phytotoxic amount of ethyl N,N-di-2-chloropropylthiolcarbamate.

9. The method of combatting weeds comprising applying to the soil a phytotoxic amount of ethyl N-3-chloroallyl-N-n-propylthiolcarbamate.

10. The method of combatting weeds comprising applying to the soil a phytotoxic amount of n-propyl N-3-chloroallyl-N-n-propylthiolcarbamate.

11. The method of combatting weeds comprising applying to the soil a phytotoxic amount of n-propyl N-3-chloroallyl-n-allylthiolcarbamate.

12. The method of combatting weeds comprising applying to the soil a phytotoxic amount of n-butyl N-3-chloroallyl-N-allylthiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,687,348 | Kosmin | Aug. 24, 1954 |

OTHER REFERENCES

Riemschneider et al.: Monatshefte für Chemie 84, 518–21 (1953).